United States Patent
Jaitly et al.

(10) Patent No.: US 11,182,566 B2
(45) Date of Patent: Nov. 23, 2021

(54) PROCESSING TEXT SEQUENCES USING NEURAL NETWORKS

(71) Applicant: Google LLC, Mountain View, CA (US)

(72) Inventors: Navdeep Jaitly, Mountain View, CA (US); Yu Zhang, Cambridge, MA (US); Quoc V. Le, Sunnyvale, CA (US); William Chan, Markham (CA)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 16/338,174

(22) PCT Filed: Oct. 3, 2017

(86) PCT No.: PCT/US2017/054833
§ 371 (c)(1),
(2) Date: Mar. 29, 2019

(87) PCT Pub. No.: WO2018/067495
PCT Pub. Date: Apr. 12, 2018

(65) Prior Publication Data
US 2020/0026765 A1  Jan. 23, 2020

Related U.S. Application Data

(60) Provisional application No. 62/403,615, filed on Oct. 3, 2016.

(51) Int. Cl.
*G06F 40/47* (2020.01)
*G06N 3/08* (2006.01)
(Continued)

(52) U.S. Cl.
CPC .......... *G06F 40/47* (2020.01); *G06N 3/084* (2013.01); *G10L 15/16* (2013.01); *G10L 15/197* (2013.01)

(58) Field of Classification Search
CPC ...... G06N 3/0454; G06N 3/0445; G06N 3/08; G06N 3/0472; G06N 3/088; G06N 3/02;
(Continued)

(56) References Cited

U.S. PATENT DOCUMENTS

| 2015/0066496 A1* | 3/2015 | Deoras | G06N 3/0472 704/232 |
| 2015/0332673 A1* | 11/2015 | Li | G06F 40/30 704/235 |

(Continued)

OTHER PUBLICATIONS

Zhang, et al., "A character-level sequence-to-sequence method for subtitle learning," 2016 IEEE 14th International Conference on Industrial Informatics (INDIN), Poitiers, Jul. 21, 2016, pp. 780-783, doi: 10.1109/INDIN.2016.7819265. (Year: 2016).*

(Continued)

*Primary Examiner* — Michelle M Koeth
(74) *Attorney, Agent, or Firm* — Fish & Richardson P.C.

(57) ABSTRACT

A computer-implemented method for training a neural network that is configured to generate a score distribution over a set of multiple output positions. The neural network is configured to process a network input to generate a respective score distribution for each of a plurality of output positions including a respective score for each token in a predetermined set of tokens that includes n-grams of multiple different sizes. Example methods described herein provide trained neural networks which produce results with improved accuracy compared to the state of the art, e.g. translations that are more accurate compared to the state of the art, or more accurate speech recognition compared to the state of the art.

20 Claims, 3 Drawing Sheets

(51) Int. Cl.
    *G10L 15/16* (2006.01)
    *G10L 15/197* (2013.01)
(58) Field of Classification Search
    CPC ........ G06N 3/084; G06N 20/00; G10L 15/16;
            G10L 15/063; G10L 15/197; G10L 15/14;
            G10L 15/32; G10L 15/08; G10L 15/142;
            G10L 15/18; G10L 25/30; G10L 17/04;
            G10L 17/18; G10L 21/10; G06F 40/151;
                                            G06F 40/47
    See application file for complete search history.

(56)                References Cited

U.S. PATENT DOCUMENTS

| 2016/0093294 | A1* | 3/2016 | Kapralova | G10L 15/01 |
| | | | | 704/232 |
| 2017/0148433 | A1* | 5/2017 | Catanzaro | G10L 15/183 |
| 2018/0011688 | A1* | 1/2018 | Wei | G06F 3/167 |

OTHER PUBLICATIONS

Sennrich et al. "Neural Machine Translation of Rare Words with Subword units," Proceedings of the 541 Annual meeting of the ACL, vol. 1, Jun. 10, 2016, 11 pages. (Year: 2016).*
Bahdanau et al. "Neural Machine Translation by Jointly Learning to Align and Translate," arXiv 1409.0473v7, May 19, 2016, 15 pages (Year: 2016).*
Wu et al., "Google's Neural Machine Translation System: Bridging the Gap between Human and Machine Translation", arXiv: 1609.08144v1 [cs.CL], Sep. 26, 2016. (Year: 2016).*
Schuster et al, "Japanese and Korean voice search," 2012 IEEE International Conference on Acoustics, Speech and Signal Processing (ICASSP), 2012, pp. 5149-5152, doi: 10.1109/ICASSP.2012.6289079. (Year: 2012).*
Wang et al., "Auto-encoder based dimensionality reduction," Neurocomputing, vol. 184, Apr. 2016, pp. 232-242, ISSN 0925-2312, https://doi.org/10.1016/j.neucom.2015.08.104. (Year: 2016).*
Vinyals et al. "Show and Tell: A Neural Image Caption Generator," IEEE Conference on CVPR, Jun. 2015, 9 pages. (Year: 2015).*
'Morpho.aalto.fi' [online] "Morpho Project," Lat updated Jul. 14, 2015, [retrieved on Apr. 4, 2019] Retrieved from Internet: URL<morpho.aalto.fi/projects/morpho/> 2 pages.
Abadi et al. "TensorFlow: Large-scale machine learning on heterogeneous systems," 12$^{th}$ USENIX Symposium on Operating Systems Design and Implementation, Nov. 2016, 21 pages.
Bahdanau et al. "End-to-end Attention-based Large Vocabulary Speech Recognition," arXiv 1508.04395v2, Mar. 14, 2016, 8 pages.
Bahdanau et al. "Neural Machine Translation by Jointly Learning to Align and Translate," arXiv 1409.0473v7, May 19, 2016, 15 pages.
Bahdanau et al. "Task Loss Estimation for sequence prediction," arXiv 1511.06456v4, Jan. 19, 2016, 13 pages.
Chan et al. "Latent Sequence Decompositions," arXiv 1610.03035v6, 12 pages.
Chan et al. "Listen, attend and spell," arXiv 1508.01211v2, Aug. 20, 2015, 16 pages.
Cho et al. "Learning Phrase Representations using RNN Encoder-Decoder for Statistical Machine Translation," arXiv 1406.1078v3, Sep. 3, 2014, 15 pages.
Chorowski et al. "Attention-Based Models for Speech Recognition," NIPS, Dec. 2015, 9 pages.
Collobert et al. "Wav2Letter: an End-to-End ConvNet-based Speech Recognition System," arXiv 1609.03193v2, Sep. 13, 2016, 8 pages.
Graves et al. "Connectionist Temporal Classification: Labelling Unsegmented sequence data with recurrent neural networks," ACM, Jun. 25, 2006, 8 pages.
Graves et al. "Hybrid speech recognition with deep bidirectional, LSTM," Automatic Speech Recognition and Understanding Workshop, Dec. 2013, 6 pages.
Graves et al. "Towards end-to-end speech recognition with recurrent neural networks," ICML, Jan. 27, 2014, 9 pages.
Graves. "Practical Variational inference for neural networks," NIPS, Dec. 2011, 9 pages.
Hannun et al. "First-Pass Large Vocabulary Continuous Speech Recognition using Bi-directional recurrent DNNs," arXiv 1408.2873v2, Dec. 8, 2014, 7 pages.
Hihi et al. "Hierarchical recurrent neural networks for long-term dependencies," NIPS Dec. 1996,7 pages.
Hochreiter et al. "Long Short-Term Memory," Neural Computation, 9(8), Nov. 1997, 32 pages.
Jean et al. "On using very large target vocabulary for neural machine translation," arXiv 1412.2007v2, Mar. 18, 2015, 10 pages.
Kingma et al. "Adam: a method for stochastic optimization," arXiv 1412.6980v9, Jan. 30, 2017, 15 pages.
Koutnik et al. "A clockwork RNN," arXiv 1402.3511v1, Feb. 14, 2014, 9 pages.
Ling et al. "Latent predictor networks for code generation," arXiv 1603.06744v2, Jun. 8, 2016, 11 pages.
Lu et al. "Acoustic data-driven pronunciation lexicon for large vocabulary speech recognition," IEEE Automatic Speech Recognition and Understanding Workshop, Dec. 8, 2013, 7 pages.
Luong et al. "Achieving Open Vocabulary Neural Machine Translation with Hybrid Word-Character Models," arXiv 1604.00788v2, Jun. 23, 2016, 11 pages.
McGraw et al. "Learning Lexicons from speech usuing a pronunciation mixture model," IEEE Transactions on Audio, Speech, and Language Processing, 21(2), Feb. 2013, 10 pages.
PCT International Search Report issued in International Application No. PCT/US2017/054833, dated Jan. 11, 2018, 19 pages.
PCT Written Opinion issued in International Application No. PCT/US2017054833, dated Nov. 14, 2018, 8 pages.
Povey et al. "The Kaldi Speech Recognition Toolkit," Automatic Speech Recognition and Understanding Workshop, Dec. 2011, 4 pages.
Ranzato et al. "Sequence Level Training with Recurrent Neural Networks," arXiv 1511.06732v7, May 6, 2016, 16 pages.
Schuster et al. "Bidirectional recurrent neural networks," IEEE Transactions on Signal Processing, 45(11), Nov. 1997, 9 pages.
Schuster et al. "Japanese and Korean Voice Search," IEEE ICASSP, Mar. 25, 2012, 4 pages.
Sennrich et al. "Neural Machine Translation of Rare Words with Subword units," Proceedings of the 54$^{th}$ Annual meeting of the ACL, vol. 1, Jun. 10, 2016, 11 pages.
Singh et al. "Automatic generation of subword units for speech recognition systems," IEEE Transaction on Speech and Audio Processing, 10(2), Feb. 2002, 11 pages.
Sutskever et al. "Sequence to sequence learning with neural networks," NIPS Dec. 2014, 9 pages.
Vinyals et al. "Grammar as a foreign language," NIPS, Dec. 2015, 9 pages.
Vinyals et al. "Order Matters; Sequence to sequence for sets," arXiv 1511.063914v4, Feb. 23, 2016, 11 pages.
Vinyals et al. "Show and Tell: A Neural Image Caption Generator," IEEE Conference on CVPR, Jun. 2015, 9 pages.
Wu et al. "Google's Neural Machine Translation System: Bridging the Gap between Human and Machine Translation," arXiv 1609.08144v2, Oct. 8, 2016, 23 pages.
Xu et al. "Show, Attend and Tell: Neural Image Caption Generation with Visual Attention," ICML, Jun. 2015, 10 pages.
Zhang et al. "Very deep convolutional networks for end-to-end speech recognition," arXiv 1610.03022v1, Oct. 10, 2016, 5 pages.
Zweig et al. "Advances in All-Neural speech recognition," arXiv 1609.05935v2, Jan. 25, 2017, 5 pages.
EP Office Action in European Appln. No. 17784512.0, dated May 14, 2019, 3 pages.
PCT International Preliminary Report on Patentability in International Appln. No. PCT/US2017/054833, dated Apr. 18, 2019, 14 pages.

* cited by examiner

PROCESSING TEXT SEQUENCES USING NEURAL NETWORKS

This application is a national stage application under 35 U.S.C. § 371 of PCT International Application No. PCT/US2017/054833, filed on Oct. 3, 2017, which claims the benefit of U.S. Non-Provisional Application Ser. No. 62/403,615, filed on Oct. 3, 2016. The contents of the foregoing applications are hereby incorporated by reference.

BACKGROUND

This specification relates to training neural networks that generate output sequences.

Machine learning models receive an input and generate an output, e.g., a predicted output, based on the received input. Some machine learning models are parametric models and generate the output based on the received input and on values of the parameters of the model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can train a neural network that receives a network input and processes the network input to generate a respective score distribution over a set tokens that includes n-grams of multiple different sizes for each of multiple output positions. Example methods described herein provide trained neural networks which produce results with improved accuracy compared to the state of the art, e.g. translations that are more accurate compared to the state of the art, or more accurate speech recognition compared to the state of the art.

In general, one innovative aspect may be embodied in a method for training a neural network that is configured to generate a score distribution over a set of multiple output positions, the method comprising: obtaining training data for training a neural network, wherein the neural network is configured to receive a network input and to process the network input in accordance with a plurality of parameters of the neural network to generate a respective score distribution for each of a plurality of output positions, wherein the respective score distribution for each of the output positions comprises a respective score for each token in a predetermined set of tokens, wherein the predetermined set of tokens includes n-grams of multiple different sizes, wherein, for each output position, the respective score for each of the tokens in the score distribution for the output position represents a likelihood that the token is a token at the output position in an output sequence for the network input, and wherein the training data comprises a plurality of training inputs, and for each training input, a respective target output sequence comprising one or more words; for each training input: processing the training input using the neural network in accordance with current values of the parameters of the neural network to generate a respective score distribution for each of a plurality of output positions; sampling, from a plurality of possible valid decompositions of the target output sequence for the training input, a valid decomposition of the target output sequence, wherein each possible valid decomposition of the target sequence decomposes the target sequence into a different sequence of tokens from the predetermined set of tokens; and adjusting the current values of the parameters of the neural network to increase likelihoods of the tokens in the sampled valid decomposition being the tokens at the corresponding output positions in the output sequence.

In some implementations, the sampled valid decomposition includes n-grams of multiple different sizes.

In some implementations, adjusting the current values of the parameters of the neural network to increase likelihoods of the tokens in the sampled valid decomposition being the tokens at the corresponding output positions in the output sequence comprises: performing an iteration of a neural network training procedure to increase a logarithm of a product of the respective scores for each token in the sampled valid decomposition in the score distribution for the output position corresponding to the position of the token in the sampled valid decomposition.

In some implementations, sampling a valid decomposition of the target output sequence comprises, for each of the plurality of output positions and in order starting from an initial position: sampling, from valid tokens in the predetermined set of tokens, a valid token randomly with probability $\varepsilon$, wherein a valid token for the output position is a token from the predetermined set of tokens that would be a valid addition to a current partial valid decomposition of the target output sequence as of the output position; and sampling, from the valid tokens, a valid token in accordance with the scores for the valid tokens in the score distribution for the output position for the training input with probability $1-\varepsilon$.

In some implementations, the method further comprises, for each of the plurality of output positions and in order starting from an initial position: providing the sampled valid token for the output position as input to the neural network for use in generating the score distribution for a next output position of the plurality of output positions.

In some implementations, one or more of the n-grams in the predetermined set of tokens are prefixes for one or more other n-grams in the predetermined set of tokens.

In some implementations, the n-grams in the predetermined set of tokens include characters and word pieces.

In some implementations, the n-grams in the predetermined set of tokens further include words.

In some implementations, the neural network is a speech recognition neural network and the network input is audio data or audio features representing an utterance.

In some implementations, the neural network is a neural machine translation neural network and the network input is a sequence of input tokens representing a sequence of words in a source language, and wherein the n-grams in the predetermined set of tokens are n-grams in a target natural language.

In some implementations, the neural network is an image caption generation neural network and the network input is an image.

In some implementations, the neural network is an autoencoder neural network and the network input is a sequence of words.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. The system as described in this specification can train neural networks that generate sequences of outputs so that the neural networks achieve results that outperform the state of the art in various tasks that involve accurately generating output sequences from network inputs. In particular, once trained using the described techniques, the neural network generates outputs that define a decomposition of the output sequence among different types of n-grams in a manner that is conditioned on the network input, unlike conventional methods, in which a fixed and pre-determined output sequence decomposition is assumed. For example, the system can train a neural machine translation neural network to generate translations that are more accurate than the state of the art, a speech recognition system to generate transcriptions that are more accurate than the state of the art, and so on.

Moreover, the system as described in this specification is computationally efficient compared to conventional models such as character models, where the output sequence is decomposed into individual characters, which causes long decoder lengths and computationally expensive inference. Therefore, because the system decomposes the sequence into longer n-grams when appropriate, the system as described in this specification can generate sequences of outputs more quickly and with fewer computational resources than conventional models such as character models while still generating high quality outputs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system, e.g. a machine learning system, implemented as computer programs on one or more computers in one or more locations, can train a neural network to receive a network input and process the network input to generate respective score distributions for each of multiple output positions.

The respective score distribution for each output position includes a respective score for each token in a set of tokens that includes n-grams of multiple different sizes in a natural language. The score for a given token in the score distribution for an output position represents the probability of the given token being the token at the output position in a natural language target sequence that corresponds to the network input.

Once trained, the neural network can be used to generate a natural language target sequence corresponding to a network input using a standard decoding process.

Figure 1:
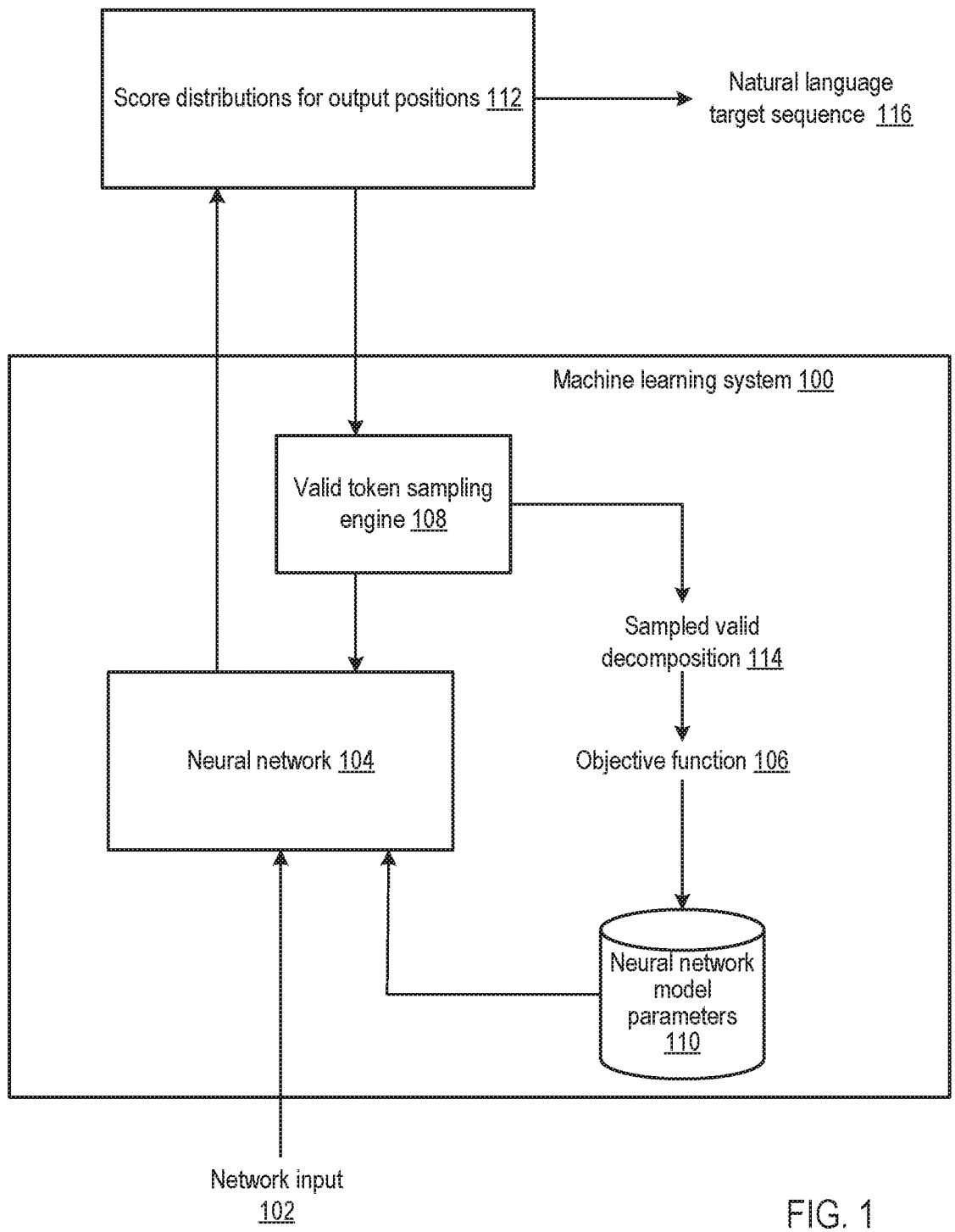
FIG. 1 shows an example machine learning system that is configured to generate a score distribution over a set of multiple output positions.

FIG. 1 shows an example machine learning system 100. The machine learning system 100 is an example of a system implemented as computer programs on one or more computers in one or more locations in which the systems, components, and techniques described below are implemented.

The machine learning system 100 includes a neural network 104 that is configured to receive a network input 102, process the network input 102 in accordance with the values of a set of neural network model parameters 110, and generate respective score distributions 112 over a set of tokens for each of multiple output positions. Once trained, the neural network 104 can be used to map a network input 102 to a corresponding natural language target sequence 116, i.e., a sequence in a target natural language, using a standard decoding process.

The score distribution for a given output position assigns a respective score to each token in a set of multiple tokens, with the score for a given token representing a likelihood that the given token should be the token at the output position in the natural language target sequence 116 corresponding to the network input 102.

The manner in which the neural network 104 generates the score distributions 112 is dependent on the machine learning task the neural network 104 has been configured to perform and on the architecture of the neural network 104.

In some cases, the task is a speech recognition task. In a speech recognition task, the network input is audio data or audio features representing an utterance and the natural language output sequence is a transcription of the audio data or audio features. An example of a speech recognition neural network that generates such score distributions and can be used for speech recognition tasks is described in William Chan, et al., "Listen, attend and spell," arXiv preprint arXiv:1508.01211 (2015).

In some cases, the task is a machine translation task. In a machine translation task, the network input is a sequence of words in a source natural language, and the natural language output sequence is a sequence of words in a target natural language that is a translation of the sequence of words in the source natural language. An example of a neural machine translation neural network that generates such score distributions and that can be used for machine translation tasks is described in Yonghui Wu, et al., "Google's Neural Machine Translation System: Bridging the Gap between Human and Machine Translation," arXiv preprint arXiv:1609.08144 (2016).

In some cases, the task is an image captioning task. In an image captioning task, the network input is an image, and the natural language output sequence is a sequence of words that is descriptive of the input image. In some cases, the task is an auto-encoding task. In an auto-encoding task, the network input is a sequence of words in a natural language, and the network output is the same as the network input. An example of a neural network that generates such score distributions and can be used for sequence to sequence machine learning tasks like auto-encoding or can be adapted to be used for an image captioning task is described in Ilya Sutskever, Oriol Vinyals, and Quoc V. Le, "Sequence to sequence learning with neural networks," Advances in neural information processing systems, 2014.

The set of tokens includes n-grams of multiple different sizes in the target natural language. For example, the set of tokens can include single characters, word pieces made up of multiple characters, and, optionally, entire words. In general, one or more of the n-grams in the set of tokens are prefixes for one or more other n-grams in the set of tokens. For example, the set of tokens can include the characters 'c', 'a', 't', and the 2-grams 'ca', 'ct', 'at', and the 3-gram 'cat', amongst others.

Any of the above-referenced neural networks can be modified to generate scores for sets of tokens that include n-grams of multiple different sizes by modifying the output layers of the neural networks, i.e., by increasing the size of the softmax output layer of the neural network and, optionally, of other layers in the neural network, so that the output layer generates a respective score for each token in the set of tokens.

Once trained, the neural network 104 can be used to generate a natural language target sequence 116 corresponding to a network input 102 using a standard decoding process, e.g., using the beam search decoding process described in William Chan, et al., "Listen, attend and spell," arXiv preprint arXiv:1508.01211 (2015), that of Yonghui Wu, et al., "Google's Neural Machine Translation System: Bridging the Gap between Human and Machine Translation," arXiv preprint arXiv: 1609.08144 (2016), or another appropriate decoding process.

To train the neural network, the system 100 obtains training data that includes training inputs, and for each training input, a respective target sequence that includes one or more words in a natural language.

For a given training input, the neural network 104 generates the respective score distributions 112 over the set of tokens for each of the multiple output positions in accordance with the current values of the neural network model parameters 110.

For the given training input, a valid token sampling engine 108 in the system 100 sequentially samples valid tokens from the set of tokens for each output position, where a given token is a valid token for an output position if the ordered concatenation of the given token with the tokens sampled by the valid token sampling engine 108 for the previous output positions yields a prefix of a valid decomposition of the target sequence. A valid decomposition of the target sequence decomposes the target sequence into a sequence of tokens from the set of tokens, i.e., so that different valid decompositions can include different numbers of tokens and can be made up of different combinations of n-grams of different sizes and of various kinds. For example, the target sequence "banana" has a valid decomposition into 1-grams, i.e. characters, as 'b', 'a', 'n', 'a', 'n', 'a', and a valid decomposition into a combination of 1-grams, 2-grams, and 3-grams, for example as: 'b', 'ana', 'na'. A prefix of a valid decomposition is an ordered sequence of consecutive tokens from the valid decomposition starting from the first token of the valid decomposition. As another example, if the target sequence is "banana", the set of tokens is the set of all 1-grams, 2-grams, and 3-grams, and the tokens sampled by the valid token sampling engine 108 for the previous output positions are 'b', 'a', and 'n', then 'a', 'an', and 'ana' are all examples of valid tokens at the current output position.

Specifically, for each output position, with probability ε, the valid token sampling engine 108 randomly samples a valid token, and with probability (1−ε), the valid token sampling engine 108 samples a valid token in accordance with the scores for the valid tokens in the score distribution for the output position generated by the neural network 104, where e is a number between 0 and 1.

The neural network 104 stops sequentially generating respective score distributions for output positions when the concatenation of the valid tokens sampled by the valid token sampling engine 108 corresponds to a valid decomposition of the target sequence, i.e. the sampled valid decomposition 114.

In general, the system 100 trains the neural network 104 by adjusting the current values of the neural network model parameters 110 to optimize the performance of the neural network 104 with respect to an objective function 106 that depends on the sampled valid decompositions 114 generated for the training inputs in the training data set. In some implementations, the system 100 provides the sampled valid token from the previous output position, i.e. the output position before the current output position, as an input to the neural network 104, and the neural network 104 generates the score distribution for the current output position based at least in part on the sampled valid token for the previous output position, and the objective function 106 is:

$$L = \sum_{j=1}^{J} \log \prod_{i=1}^{I} s(z_i^j \mid x^j, z_{<i}^j),$$

where J is the number of training inputs, I is the number of output positions, and $s(z_i^j|x^j, z_{<i}^j)$ is the score generated by the neural network 104 during the processing of the training input $x^j$ for the token $z_i^j$, where $z_i^j$ is the token sampled by the valid token sampling engine 108 for output position i in the sampled valid decomposition 114 that the system 100 generated for $x^j$, and $z_{<i}^j$ is the set of tokens sampled by the valid token sampling engine 108 for output positions before position i.

The system adjusts the current values of the neural network model parameters 110 to optimize the objective function using standard machine learning training techniques, such as stochastic gradient descent with backpropagation or backpropagation through time.

Figure 2:
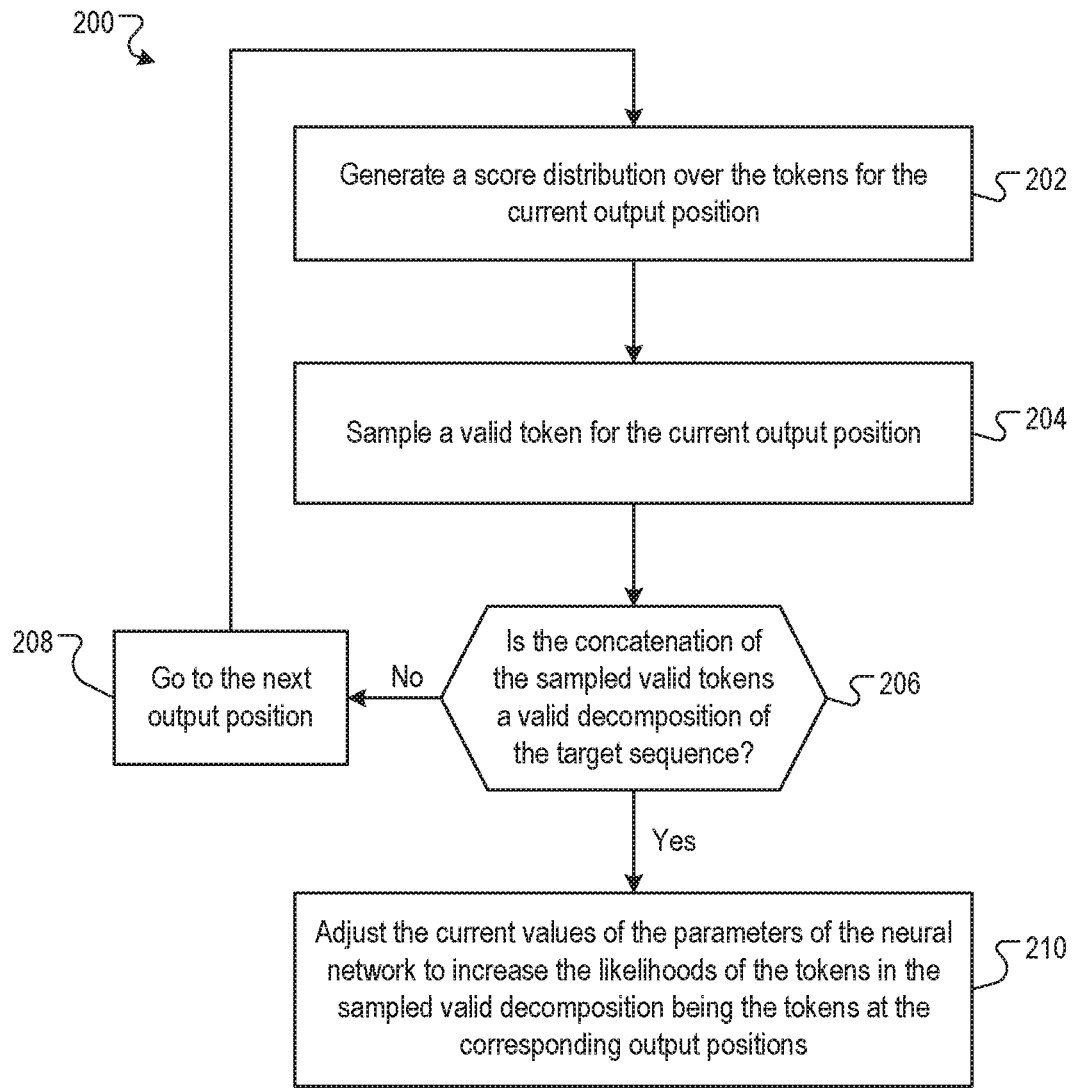
FIG. 2 is an example process for training the machine learning system.

FIG. 2 is a flow diagram of an example process 200 for training the machine learning system. For convenience, the process 200 will be described as being performed by a system of one or more computers located in one or more locations. For example, a machine learning system, e.g., the machine learning system 100 of FIG. 1, appropriately programmed in accordance with this specification, can perform the process 200.

The system obtains a score distribution over the set of tokens generated by the neural network for the current output position for the given training input (step 202). The score distribution for the current output position assigns a respective score to each token in a set of multiple tokens, with the score for a given token representing a likelihood that the given token should be the token at the current output position in the natural language target sequence corresponding to the training input.

The way the neural network generates the score distribution depends on the machine learning task that is being performed and the architecture of the neural network. In some implementations, the system provides the sampled valid token from the previous output position, i.e. the output position before the current output position, as an input to the neural network, and the neural network generates the score distribution for the current output position based at least in part on the sampled valid token for the previous output position. Reference is directed to Ilya Sutskever, Oriol Vinyals, and Quoc V. Le, "Sequence to sequence learning with neural networks," Advances in neural information processing systems, 2014.

The system samples a valid token for the current output position (step 204). A given token is a valid token for the current output position if the ordered concatenation of the given token with valid tokens sampled for previous output positions yields a prefix of a valid decomposition of the target sequence. An example technique of sampling a valid token for the current output position is described with reference to process 300 of FIG. 3.

The system determines whether the ordered concatenation of the sampled valid tokens for previous output positions and sampled valid token for the current output position is a valid decomposition of the target sequence (step 206).

In response to determining that the ordered concatenation of the sampled valid tokens for previous output positions and the sampled valid token for the current output position is not a valid decomposition of the target sequence, the system goes to the next output position, returns to step 202, and repeats the preceding steps (step 208).

In response to determining that the ordered concatenation of the sampled valid tokens for previous output positions and the sampled valid token for the current output position is a valid decomposition of the target sequence, the system adjusts the current values of the parameters of the neural network to increase the likelihoods of the tokens in the sampled valid decomposition being the tokens at the corresponding output positions (step 210). In some implementations, adjusting the current values of the parameters of the neural network involves performing an iteration of a neural network training procedure to increase a logarithm of a product of the respective scores for each token in the valid decomposition in the score distribution for the output position corresponding to the position of the token in the sampled valid decomposition. For example, the neural network training procedure may be backpropagation or backpropagation through time.

Figure 3:
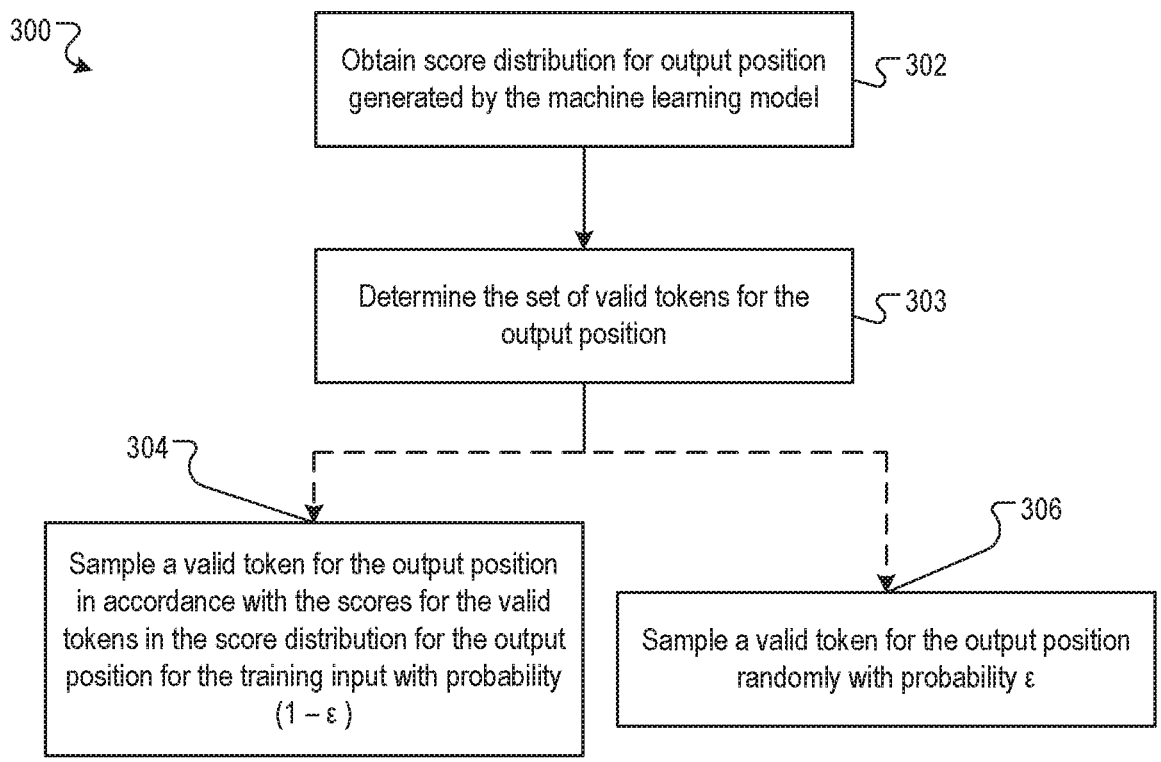
FIG. 3 is an example process for sampling a valid token for an output position.

FIG. 3 is a flow diagram of an example process 300 for sampling a valid token for an output position. For convenience, the process 300 will be described as being performed by a system of one or more computers located in one or more locations. For example, a machine learning system, e.g., the machine learning system 100 of FIG. 1, appropriately programmed in accordance with this specification, can perform the process 300.

The steps of the process 300 are described with reference to a number c that is between 0 and 1. The value of c may be different for different executions of the process 200 for generating sampled valid decompositions for training inputs. In some implementations, the value of epsilon is initially set to a non-zero value, and the value of epsilon is reduced as the system performs the training process 200 multiple times, until it is eventually set to zero.

The system obtains the score distribution over the tokens for the current output position (step 302).

The system determines the set of valid tokens for the output position (step 303). A given token is a valid token for the output position if the ordered concatenation of the given token with the tokens sampled for the previous output positions yields a prefix of a valid decomposition of the target sequence.

With probability ε, the system randomly samples a valid token from the set of all possible valid tokens (step 304).

With probability (1−ε), the system samples a valid token from a probability distribution defined by restricting the score distribution for the current output position generated by the neural network to the set of valid tokens.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
obtaining training data for training a neural network,
wherein the neural network is configured to receive a network input and to process the network input in accordance with a plurality of parameters of the neural network to generate a respective score distribution for each of a plurality of output positions in a predicted output sequence for the network input,
wherein the respective score distribution for each of the output positions in the predicted output sequence for the network input comprises a respective score for each token in a predetermined set of tokens,
wherein the predetermined set of tokens includes n-grams of multiple different sizes,
wherein, for each output position in the predicted output sequence for the network input, the respective score for each of the tokens in the respective score distribution for the output position represents a likelihood that the token is a token at the output position in the predicted output sequence for the network input, and
wherein the training data comprises a plurality of training inputs, and for each training input, a respective target output sequence comprising one or more words;
for each training input:
processing the training input using the neural network in accordance with current values of the parameters of the neural network to generate a respective score distribution for each of a plurality of output positions in a predicted output sequence for the training input;
sampling, from a plurality of possible valid decompositions of the target output sequence for the training input, a valid decomposition of the target output sequence that includes n-grams of different sizes at respective output positions of the plurality of output positions in the predicted output sequence for the training input, wherein each possible valid decomposition of the target output sequence decomposes the target output sequence into a different sequence of tokens from the predetermined set of tokens, wherein the sampling comprises, for each of one or more of the plurality of output positions in the predicted output sequence for the training input:
sampling, from valid tokens in the predetermined set of tokens, a valid token in accordance with the scores for the valid tokens in the respective score distribution for the output position in the predicted output sequence for the training input,
wherein a valid token for the output position in the predicted output sequence for the training input is a token from the predetermined set of tokens that would be a valid addition to a current partial valid decomposition of the target output sequence as of the output position in the predicted output sequence for the training input; and
adjusting the current values of the parameters of the neural network to increase likelihoods of the tokens in the sampled valid decomposition being the tokens at the corresponding output positions in the predicted output sequence for the training input.

2. The method of claim 1, wherein for each training input, adjusting the current values of the parameters of the neural network to increase likelihoods of the tokens in the sampled valid decomposition being the tokens at the corresponding output positions in the predicted output sequence for the training input comprises:
performing an iteration of a neural network training procedure to increase a logarithm of a product of the respective scores for each token in the sampled valid decomposition in the respective score distribution for the output position, in the predicted output sequence for the training input, that corresponds corresponding to the position of the token in the sampled valid decomposition.

3. The method of claim 1, wherein for each training input, the sampling further comprises, for each of one or more of the plurality of output positions in the predicted output sequence for the training input:
sampling, from valid tokens in the predetermined set of tokens, a valid token randomly.

4. The method of claim 1, wherein for each training input, the method further comprises, for each of the plurality of output positions in the predicted output sequence for the training input, and in order starting from an initial position:
providing a sampled valid token for the output position as input to the neural network for use in generating the respective score distribution for a next output position of the plurality of output positions in the predicted output sequence for the training input.

5. The method of claim 1, wherein one or more of the n-grams in the predetermined set of tokens are prefixes for one or more other n-grams in the predetermined set of tokens.

6. The method of claim 1, wherein the n-grams in the predetermined set of tokens include characters and word pieces.

7. The method of claim 6, wherein the n-grams in the predetermined set of tokens further include words.

8. The method of claim 1, wherein the neural network is a speech recognition neural network and the network input is audio data or audio features representing an utterance.

9. The method of claim 1, wherein the neural network is a neural machine translation neural network and the network input is a sequence of input tokens representing a sequence of words in a source language, and wherein the n-grams in the predetermined set of tokens are n-grams in a target natural language.

10. The method of claim 1, wherein the neural network is an image caption generation neural network and the network input is an image.

11. The method of claim 1, wherein the neural network is an auto-encoder neural network and the network input is a sequence of words.

12. A system comprising one or more computers and one or more storage devices storing instructions that when executed by the one or more computers cause the one or more computers to perform operations comprising:
obtaining training data for training a neural network,
wherein the neural network is configured to receive a network input and to process the network input in accordance with a plurality of parameters of the neural network to generate a respective score distribution for each of a plurality of output positions in a predicted output sequence for the network input, wherein the respective score distribution for each of the output positions in the predicted output sequence for the network input comprises a respective score for each token in a predetermined set of tokens, wherein the predetermined set of tokens includes n-grams of multiple different sizes, wherein, for each output position in the predicted output sequence for the network input, the respective score for each of the tokens in the respective score distribution for the output position in the predicted output sequence for the network input represents a likelihood that the token is a token at the output position in the predicted output sequence for the network input, and wherein the training data comprises a plurality of training inputs, and for each training input, a respective target output sequence comprising one or more words;

for each training input:

processing the training input using the neural network in accordance with current values of the parameters of the neural network to generate a respective score distribution for each of a plurality of output positions in a predicted output sequence for the training input;

sampling, from a plurality of possible valid decompositions of the target output sequence for the training input, a valid decomposition of the target output sequence that includes n-grams of different sizes at respective output positions of the plurality of output positions in the predicted output sequence for the training input, wherein each possible valid decomposition of the target output sequence decomposes the target output sequence into a different sequence of tokens from the predetermined set of tokens, wherein the sampling comprises, for each of one or more of the plurality of output positions in the predicted output sequence for the training input:

sampling, from valid tokens in the predetermined set of tokens, a valid token in accordance with the scores for the valid tokens in the respective score distribution for the output position in the predicted output sequence for the training input, wherein a valid token for the output position in the predicted output sequence for the training input is a token from the predetermined set of tokens that would be a valid addition to a current partial valid decomposition of the target output sequence as of the output position in the predicted output sequence for the training input; and adjusting the current values of the parameters of the neural network to increase likelihoods of the tokens in the sampled valid decomposition being the tokens at the corresponding output positions in the predicted output sequence for the training input.

13. One or more non-transitory computer storage media storing instructions that when executed by one or more computers cause the one or more computers to perform operations comprising:

obtaining training data for training a neural network, wherein the neural network is configured to receive a network input and to process the network input in accordance with a plurality of parameters of the neural network to generate a respective score distribution for each of a plurality of output positions in a predicted output sequence for the network input, wherein the respective score distribution for each of the output positions in the predicted output sequence for the network input comprises a respective score for each token in a predetermined set of tokens, wherein the predetermined set of tokens includes n-grams of multiple different sizes, wherein, for each output position in the predicted output sequence for the network input, the respective score for each of the tokens in the respective score distribution for the output position in the predicted output sequence for the network input represents a likelihood that the token is a token at the output position in the predicted output sequence for the network input, and wherein the training data comprises a plurality of training inputs, and for each training input, a respective target output sequence comprising one or more words;

for each training input:

processing the training input using the neural network in accordance with current values of the parameters of the neural network to generate a respective score distribution for each of a plurality of output positions in a predicted output sequence for the training input;

sampling, from a plurality of possible valid decompositions of the target output sequence for the training input, a valid decomposition of the target output sequence that includes n-grams of different sizes at respective output positions of the plurality of output positions in the predicted output sequence for the training input, wherein each possible valid decomposition of the target output sequence decomposes the target output sequence into a different sequence of tokens from the predetermined set of tokens, wherein the sampling comprises, for each of one or more of the plurality of output positions in the predicted output sequence for the training input:

sampling, from valid tokens in the predetermined set of tokens, a valid token in accordance with the scores for the valid tokens in the respective score distribution for the output position in the predicted output sequence for the training input, wherein a valid token for the output position in the predicted output sequence for the training input is a token from the predetermined set of tokens that would be a valid addition to a current partial valid decomposition of the target output sequence as of the output position in the predicted output sequence for the training input; and adjusting the current values of the parameters of the neural network to increase likelihoods of the tokens in the sampled valid decomposition being the tokens at the corresponding output positions in the predicted output sequence for the training input.

14. The non-transitory computer storage media of claim 13, wherein for each training input, adjusting the current values of the parameters of the neural network to increase likelihoods of the tokens in the sampled valid decomposition being the tokens at the corresponding output positions in the predicted output sequence for the training input comprises:

performing an iteration of a neural network training procedure to increase a logarithm of a product of the respective scores for each token in the sampled valid decomposition in the respective score distribution for the output position, in the predicted output sequence for the training input, that corresponds to the position of the token in the sampled valid decomposition.

15. The non-transitory computer storage media of claim 13, wherein for each training input, the sampling further comprises, for each of one or more of the plurality of output positions in the predicted output sequence for the training input:
sampling, from valid tokens in the predetermined set of tokens, a valid token randomly.

16. The non-transitory computer storage media of claim 13, wherein for each training input, the operations further comprise, for each of the plurality of output positions in the predicted output sequence for the training input and in order starting from an initial position:
providing a sampled valid token for the output position as input to the neural network for use in generating the respective score distribution for a next output position of the plurality of output positions in the predicted output sequence for the training input.

17. The non-transitory computer storage media of claim 13, wherein one or more of the n-grams in the predetermined set of tokens are prefixes for one or more other n-grams in the predetermined set of tokens.

18. The non-transitory computer storage media of claim 13, wherein the n-grams in the predetermined set of tokens include characters and word pieces.

19. The method of claim 3, wherein for each training input, for each of the plurality of output positions in the predicted output sequence for the training input and in order starting from an initial position:
a valid token for the output position is sampled from valid tokens in the predetermined set of tokens randomly with probability $\varepsilon$, and
a valid token for the output position is sampled from valid tokens in the predetermined set of tokens in accordance with the scores for the valid tokens in the respective score distribution for the output position for the training input with probability $1-\varepsilon$.

20. The non-transitory computer storage media of claim 13, wherein the neural network is a neural machine translation neural network and the network input is a sequence of input tokens representing a sequence of words in a source language, and wherein the n-grams in the predetermined set of tokens are n-grams in a target natural language.

* * * * *